(12) United States Patent
Hartlaub

(10) Patent No.: US 10,409,852 B2
(45) Date of Patent: *Sep. 10, 2019

(54) METHOD, APPARATUS, AND COMPUTER PROGRAM PRODUCT FOR USER-SPECIFIC CONTEXTUAL INTEGRATION FOR A SEARCHABLE ENTERPRISE PLATFORM

(71) Applicant: ATLASSIAN PTY LTD, Sydney (AU)

(72) Inventor: Jon Hartlaub, Mountain View, CA (US)

(73) Assignee: ATLASSIAN PTY LTD, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/633,640

(22) Filed: Jun. 26, 2017

(65) Prior Publication Data
US 2018/0189282 A1    Jul. 5, 2018

Related U.S. Application Data

(60) Provisional application No. 62/440,465, filed on Dec. 30, 2016.

(51) Int. Cl.
| G06F 7/00 | (2006.01) |
| G06F 17/30 | (2006.01) |
| G06F 16/435 | (2019.01) |
| G06N 20/00 | (2019.01) |
| G06F 16/9535 | (2019.01) |

(52) U.S. Cl.
CPC ........ G06F 16/437 (2019.01); G06F 16/9535 (2019.01); G06N 20/00 (2019.01)

(58) Field of Classification Search
CPC ........ G06F 17/30035; G06F 17/30867; G06N 99/005

USPC .......................................................... 707/700
See application file for complete search history.

(56) References Cited

U.S. PATENT DOCUMENTS

| 8,732,696 | B2* | 5/2014 | Bukary | G06Q 10/00 705/7.11 |
| 2005/0160412 | A1* | 7/2005 | Thurner | G06F 8/24 717/148 |
| 2009/0248682 | A1* | 10/2009 | Hueter | G06Q 10/00 |
| 2010/0228715 | A1* | 9/2010 | Lawrence | G06F 16/9535 707/706 |
| 2012/0016875 | A1* | 1/2012 | Jin | G06F 16/9535 707/734 |
| 2012/0323876 | A1* | 12/2012 | Lymberopoulos | G06F 16/9535 707/706 |

(Continued)

*Primary Examiner* — Binh V Ho
(74) *Attorney, Agent, or Firm* — Hickman Palermo Becker Bingham LLP

(57) ABSTRACT

Embodiments of the present invention provide methods, systems, apparatuses, and computer program products for integrating user-specific context indicators into a searchable enterprise platform. In one embodiment, an apparatus is configured to apply a learned user profile, to a set of search results to obtain a user-specific, ranked arrangement of search results. The learned user profile may be developed through the application of a machine learning and/or trained model to a set of user behaviors that have been determined or otherwise detected within an enterprise platform, such that the user-specific context in which a user's search arises can be modeled and applied to retrieved digital content items associated with a search query within the enterprise platform.

18 Claims, 7 Drawing Sheets

(56) References Cited

U.S. PATENT DOCUMENTS

| | | | |
|---|---|---|---|
| 2015/0262077 A1* | 9/2015 | White | G06N 20/00 706/12 |
| 2015/0347585 A1* | 12/2015 | Klotz | G06F 16/24578 707/706 |
| 2016/0026641 A1* | 1/2016 | Young | G06F 16/24578 707/734 |
| 2016/0196336 A1* | 7/2016 | Allen | G06F 16/9535 707/734 |
| 2018/0025089 A1* | 1/2018 | Chin | G06F 16/337 707/706 |
| 2018/0060915 A1* | 3/2018 | Liu | G06Q 30/0269 |

* cited by examiner

METHOD, APPARATUS, AND COMPUTER PROGRAM PRODUCT FOR USER-SPECIFIC CONTEXTUAL INTEGRATION FOR A SEARCHABLE ENTERPRISE PLATFORM

CROSS-REFERENCE TO RELATED APPLICATIONS

The present application claims the benefit of U.S. Provisional Patent Application Ser. No. 62/440,465 which was filed on Dec. 30, 2016 and titled METHOD, APPARATUS, AND COMPUTER PROGRAM PRODUCT FOR USER-SPECIFIC CONTEXTUAL INTEGRATION FOR A SEARCHABLE ENTERPRISE PLATFORM, the entire content of which is incorporated by reference herein for all purposes.

BACKGROUND

An enterprise platform may support multiple distinct software applications. Applicant has identified a number of deficiencies and problems associated with searching across an enterprise platform, including problems associated with ranking search results in a manner that integrates contextual differences across users of the enterprise platform. Through applied effort, ingenuity, and innovation, many of these identified problems have been solved by developing solutions that are included in embodiments of the present invention, many examples of which are described in detail herein.

BRIEF SUMMARY

This specification relates to providing user-specific context integration for a searchable enterprise platform based on detected and otherwise learned user-specific behaviors and traits within the enterprise platform. In some example embodiment, a computing entity or apparatus is configured to receive a search request from a client device associated with a learned user profile; retrieve a set of learned user profile values associated with the user profile; retrieve a set of search results comprising a preliminary digital content item set that is associated with the plurality of software applications, wherein retrieving the set of search results comprises applying the search request to a first model; apply the set of search results and the set of learned user profile values associated with the learned user profile to a second model to produce a user-specific digital content item set; and output the user-specific digital content item set to the client device associated with the user.

In one example embodiment, an apparatus for integrating user-specific context indicators to a searchable enterprise platform comprising a plurality of software applications is provided, the apparatus comprising at least one processor and at least one memory including computer program code, the at least one memory and the computer program code configured to, with the at least one processor, cause the apparatus to: receive a search request from a client device associated with a learned user profile; retrieve a set of learned user profile values associated with the learned user profile; retrieve a set of search results comprising a preliminary digital content item set that is associated with the plurality of software applications, wherein retrieving the set of search results comprises applying the search request to a first model; apply the set of search results and the set of learned user profile values associated with the learned user profile to a second model to produce a user-specific digital content item set; and output the user-specific digital content item set to the client device associated with the user.

In some example implementations of such an apparatus, applying the set of search results and the set of learned user profile values associated with the user profile to the second model to produce the user-specific digital content item set comprises: applying a plurality of profile context weights to each digital content item of the set of search results, wherein the profile context weights are based at least in part on the set of learned user profile values; ranking each digital content item of the set of search results according to the applied profile context weights; and arranging the set of search results according to the ranking.

In some such example implementations, and in other example implementations, the first model is a term vector model. In some such example implementations, and in other example implementations, the second model is a multiple additive regression trees model.

In some example implementations of such an apparatus, the set of learned user profile values associated with the learned user profile comprise at least one of: a user content consumption history and a user role within an entity associated with the enterprise platform. In some such example implementations, and in other example implementations, the user content consumption history contains a set of use time data associated with a set of digital content items previously viewed by the user associated with the learned user profile. In some such example implementations, and in other example implementations, the user content consumption history further contains a topic mix identification associated with a set of digital content items previously viewed by the user associated with the learned user profile.

In another example embodiment, a method is provided, the method comprising: receiving a search request from a client device associated with a learned user profile; retrieving a set of learned user profile values associated with the learned user profile; retrieving a set of search results comprising a preliminary digital content item set that is associated with the plurality of software applications, wherein retrieving the set of search results comprises applying the search request to a first model; applying the set of search results and the set of learned user profile values associated with the learned user profile to a second model to produce a user-specific digital content item set; and outputting the user-specific digital content item set to the client device associated with the user.

In some example implementations of such a method, applying the set of search results and the set of learned user profile values associated with the user profile to the second model to produce the user-specific digital content item set comprises: applying a plurality of profile context weights to each digital content item of the set of search results, wherein the profile context weights are based at least in part on the set of learned user profile values; ranking each digital content item of the set of search results according to the applied profile context weights; and arranging the set of search results according to the ranking. In some such example implementations, and in other example implementations, the first model is a term vector model. In some such example implementations, and in other example implementations, the second model is a multiple additive regression trees model.

In some example implementations of such a method, the set of learned user profile values associated with the learned user profile comprise at least one of: a user content consumption history and a user role within an entity associated with the enterprise platform. In some such example implementations, and in other example implementations, the user content consumption history contains a set of use time data associated with a set of digital content items previously viewed by the user associated with the learned user profile. In some such example implementations, and in other example implementations, the user content consumption history further contains a topic mix identification associated with a set of digital content items previously viewed by the user associated with the learned user profile.

In another example embodiment, a computer program product is provided, computer program product comprising at least one non-transitory computer-readable storage medium having computer-executable program code instruction stored therein, the computer-executable program code instructions comprising program code instructions configured to: receive a search request from a client device associated with a learned user profile; retrieve a set of learned user profile values associated with the learned user profile; retrieve a set of search results comprising a preliminary digital content item set that is associated with the plurality of software applications, wherein retrieving the set of search results comprises applying the search request to a first model; apply the set of search results and the set of learned user profile values associated with the learned user profile to a second model to produce a user-specific digital content item set; and output the user-specific digital content item set to the client device associated with the user.

In some example implementations of such a computer program product, applying the set of search results and the set of learned user profile values associated with the user profile to the second model to produce the user-specific digital content item set comprises: applying a plurality of profile context weights to each digital content item of the set of search results, wherein the profile context weights are based at least in part on the set of learned user profile values; ranking each digital content item of the set of search results according to the applied profile context weights; and arranging the set of search results according to the ranking.

In some such example implementations, and in other example implementations, the first model is a term vector model. In some such example implementations, and in other example implementations, the second model is a multiple additive regression trees model.

In some example implementations, the set of learned user profile values associated with the learned user profile comprise at least one of: a user content consumption history and a user role within an entity associated with the enterprise platform. In some such example implementations, the user content consumption history contains a set of use time data associated with a set of digital content items previously viewed by the user associated with the learned user profile. In some such example implementations, the user content consumption history further contains a topic mix identification associated with a set of digital content items previously viewed by the user associated with the learned user profile.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
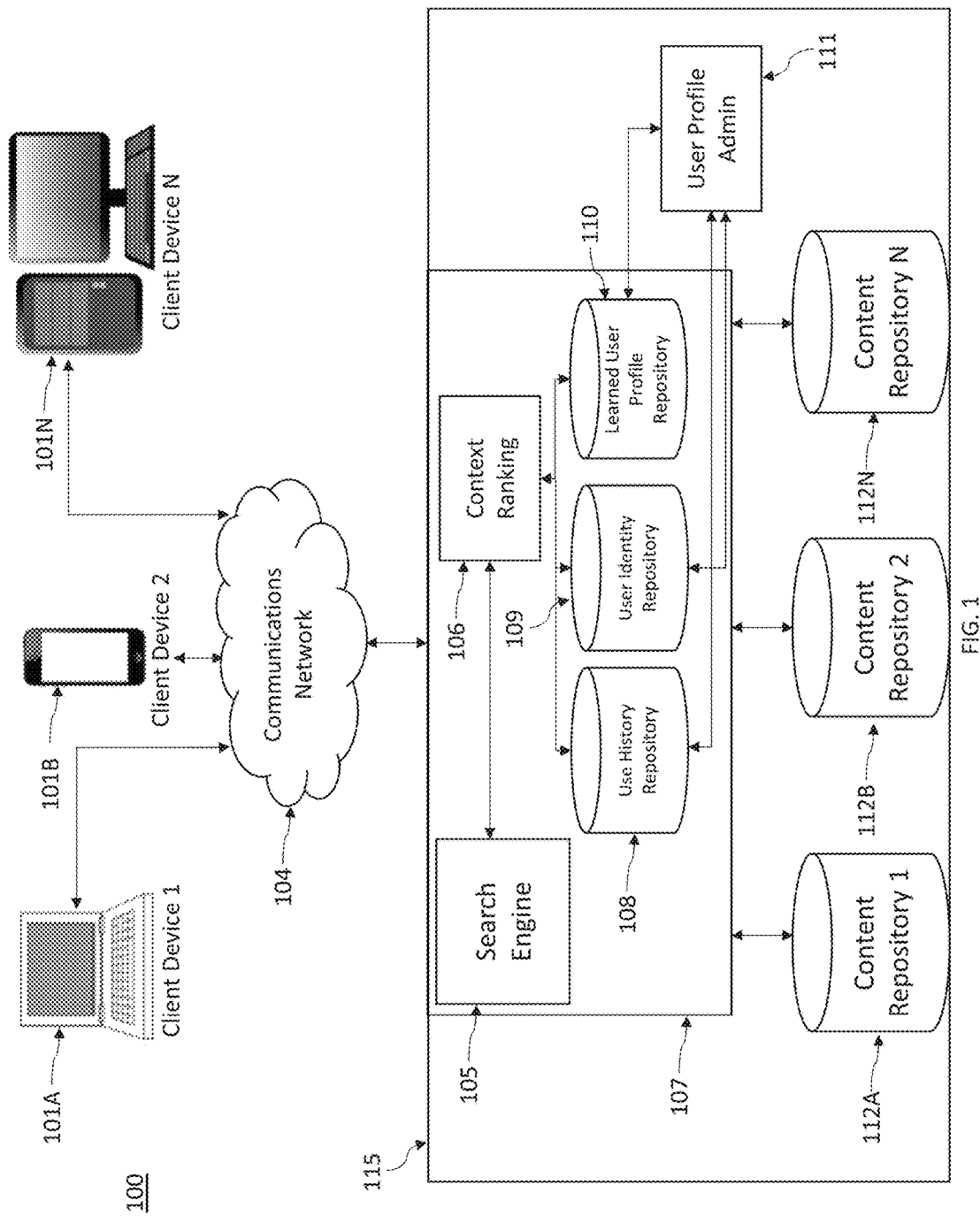
Figure 2:
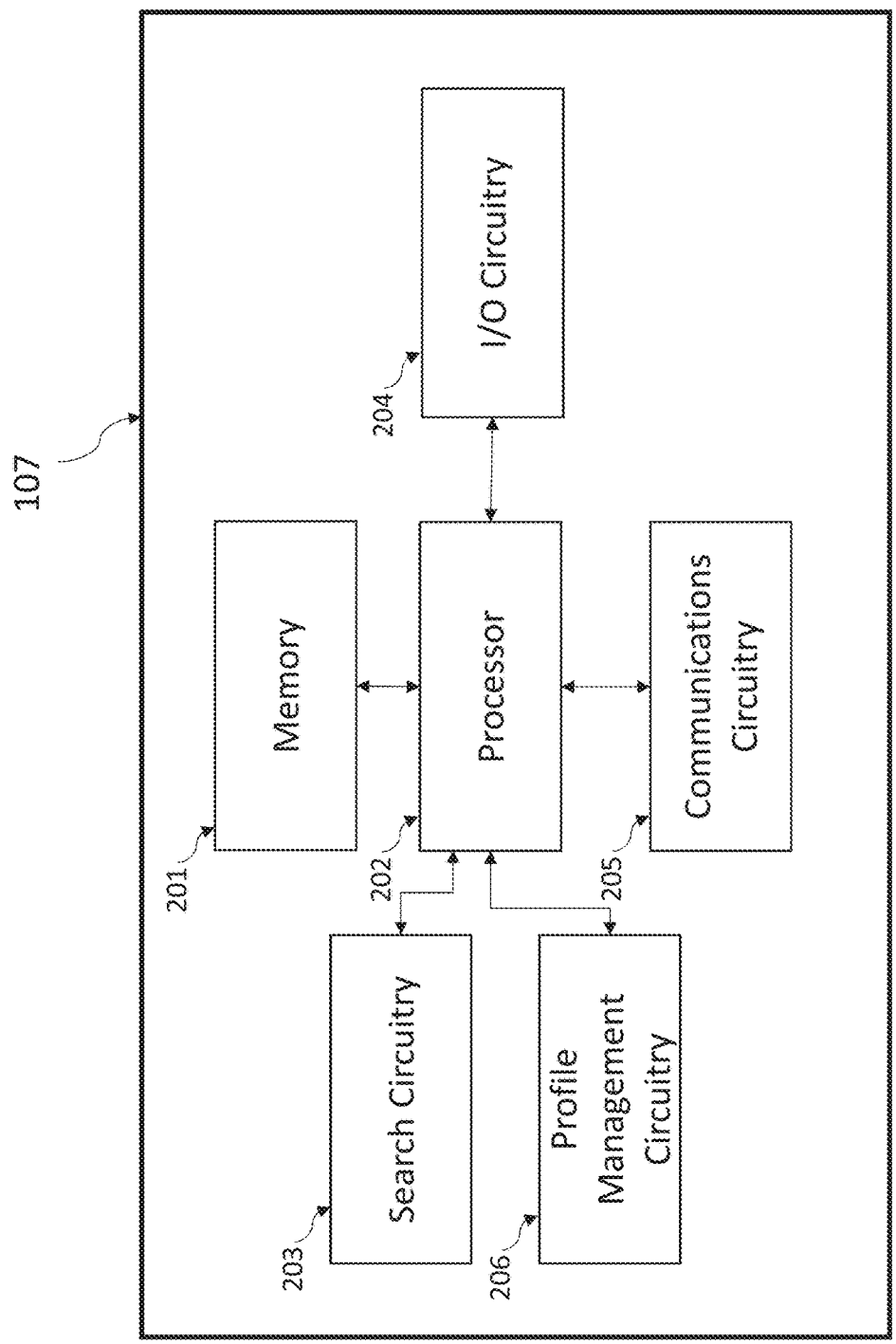
Figure 3:
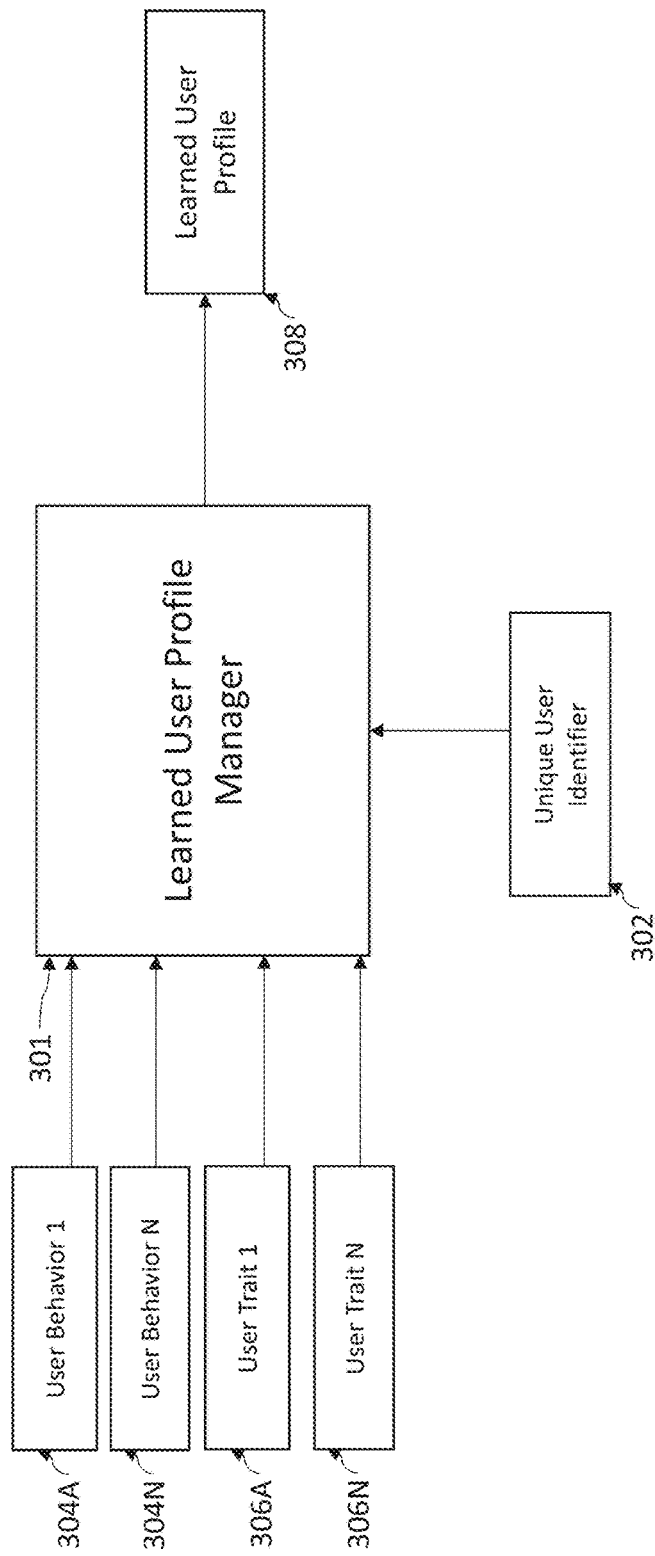
Figure 4:
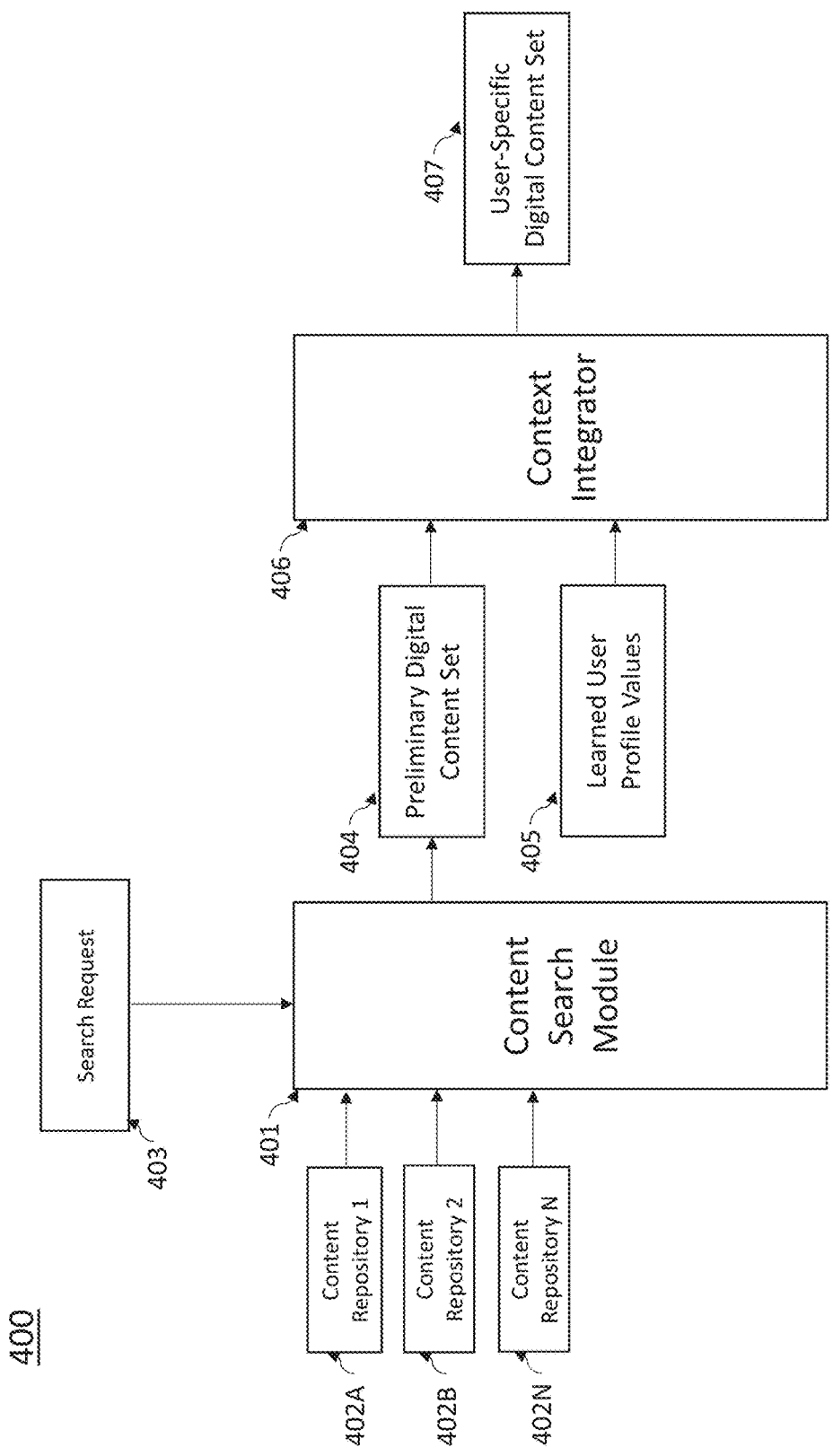
Figure 5:
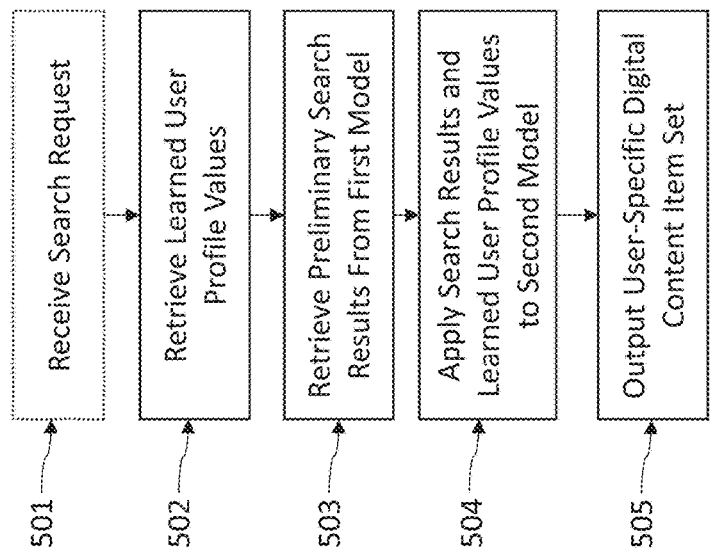
Figure 6A:
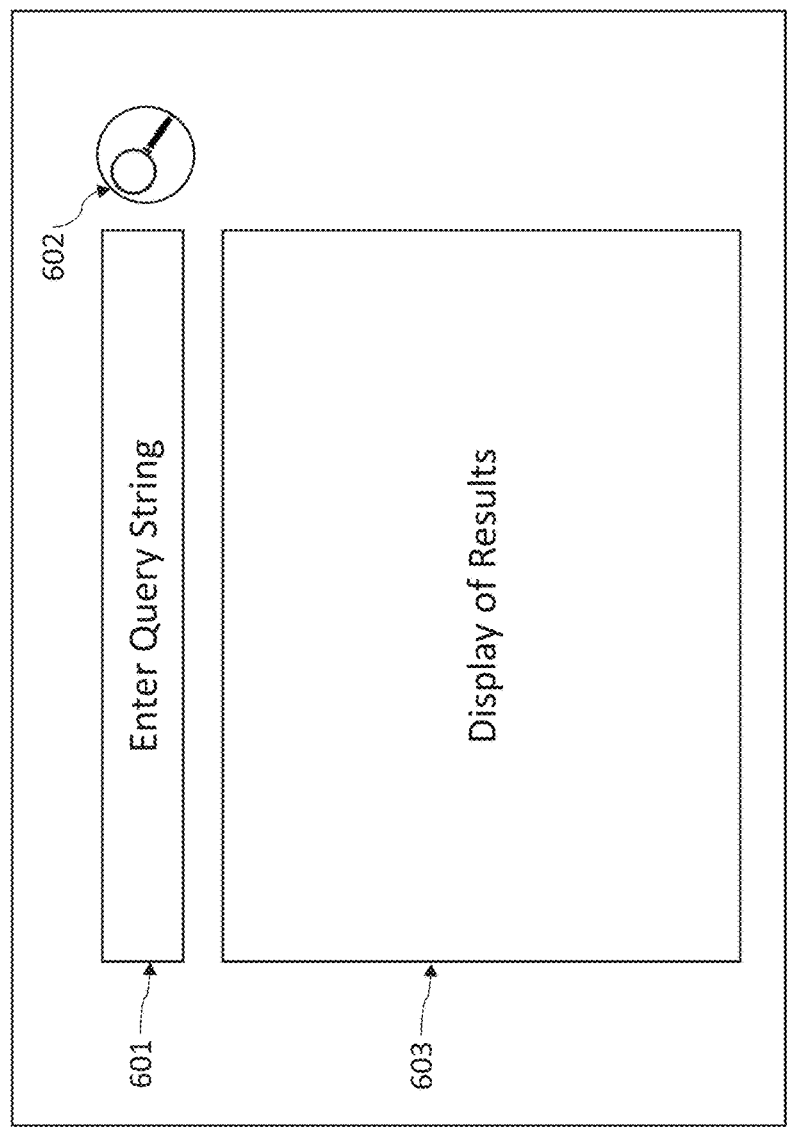
Figure 6B:
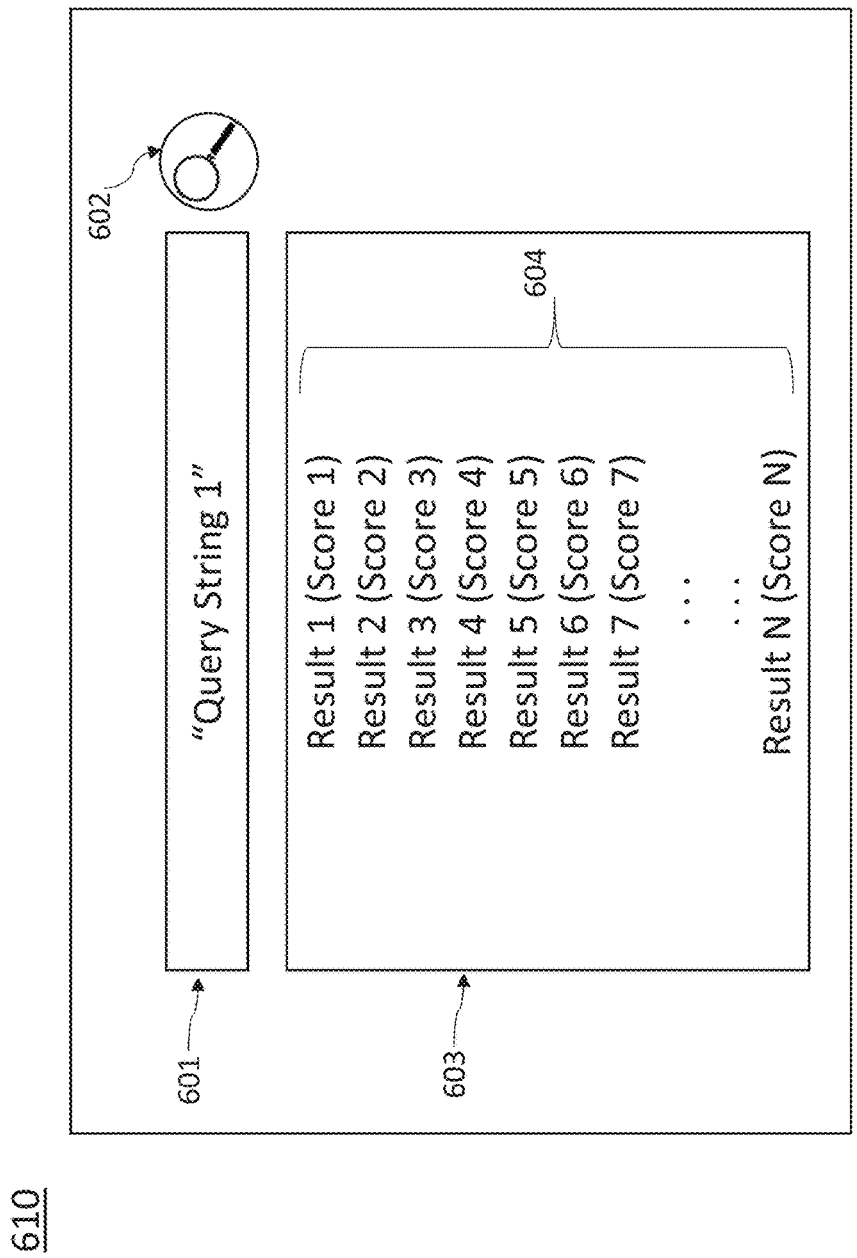

Having thus described the invention in general terms, reference will now be made to the accompanying drawings, which are not necessarily drawn to scale, and wherein:

FIG. 1 is a system architecture diagram of an enterprise platform system configured to practice embodiments of the present invention;

FIG. 2 is an example schematic diagram of a computing entity according to one embodiment of the present invention;

FIG. 3 illustrates an example learned user profile management data flow according to one embodiment of the present invention;

FIG. 4 illustrates an example context integration results ranking data flow according to one embodiment of the present invention;

FIG. 5 illustrates an example search results ranking process according to one embodiment of the present invention;

FIG. 6A illustrates an example search interface for use with embodiments of the present invention; and FIG. 6B illustrates an example search results interface for use with embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to an enterprise platform that supports multiple software applications. In some situations, an enterprise platform may establish an environment that contains a substantial portion (and in some cases, all) of the software applications that a user may interact with in the course of the user's endeavors. Enterprise platform systems structured in accordance with various embodiments of the invention are further configured to support searching. For example, the methods, apparatus and computer program products described herein are operable to receive a search query from a user operating a client device and return search results comprising a digital content item set that is associated with multiple software applications within the enterprise environment. The results are arranged for display to the user according to various rules.

A searchable enterprise platform may utilize a network and one or more content repositories to provide a user with the ability to search for digital content items across the multiple software applications supported by the enterprise platform. However, at least in part because different users approach search queries from different perspectives and in different contexts, different users may seek the same types of content within an enterprise platform using different search terms and/or search queries. Likewise, different users may use the same or similar search terms and/or search queries to seek significantly different content within an enterprise platform. Consequently, traditional search methodologies and traditional approaches to ranking search results often lead to situations where users are presented with a volume of search results that, while technically responsive to a search query or other search request, are not particularly relevant to and/or aligned with a particular user's needs.

The inventors have identified that, in contexts that involve an enterprise platform, it is possible to identify, collect, and process information associated with a potentially wide range of user behaviors and other user information. Such behavioral trait information and other user-specific information can be aggregated and applied to a machine-learning model to create and develop a user-specific, learned user profile that reflects at least some of the characteristics and other aspects that establish a context in which a particular user's search arises. The inventors have also identified that the learned user profile can be used to enhance the searching functionalities associated with an enterprise platform by using the learned user profile to adjust the ranking and/or other presentation of search results for a particular user in a manner that improves the correlation between the highest-ranked search results and the material for which the particular user is searching.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "enterprise platform" or enterprise platform system refers to a computing service that is accessible via one or more computing devices and that is operable to provide access to a plurality of software applications related to business operations of an enterprise or company. In some examples, the enterprise platform may take the form of a central server disposed in communication with one or more additional servers running software applications, and having access to one or more databases storing digital content items and application related data and/or the like.

The term "software application" refers to a computer program designed to perform a group of coordinated functions, tasks, or activities for the benefit of a user or group of users. Examples of a software application may include an enterprise knowledge management and collaboration software (e.g., Confluence® by Atlassian), an enterprise software project planning and tracking application (e.g., Jira® by Atlassian, StatusPage® by Atlassian), a word processor, a spreadsheet, an accounting application, a web browser, a media player, a computer coding project collaboration engine (e.g., Bitbucket® by Atlassian, SourceTree® by Atlassian, Bamboo® by Atlassian, Clover® by Atlassian, FishEye® by Atlassian, Crucible® by Atlassian), a scheduling engine, or an electronic networked messaging application (e.g., HipChat® by Atlassian). A software application may also refer to a collection of software applications. Software applications may be bundled for a computer and its system software or published separately, and may be coded as proprietary, or open source. Software applications may also be built for mobile platforms.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "digital content items" refers to any electronic media content item that is intended to be used in either an electronic form or as printed output and which is retrievable by or otherwise associated with any of the plurality of software applications that are accessible by the enterprise platform. A digital content item, for example, may be in the form of a stored document associated with a collaborative project within a software application. Other digital content items include images, audio files, video files, text files, and the like.

The term "user profile" refers to a collection of preferences, settings, configurations, client device identifiers, data, and information associated with a specific user. A profile refers therefore to the explicit digital representation of a person's identity and other data or information associated with the user. A user profile configured in accordance with the present invention is accessible by one or more of the software applications that are supported by the enterprise platform and, thus, may include application-specific preferences, settings, configurations, data, and information. In some embodiments, a user profile can be used to store a description of characteristics of the user and/or of the client device, as well as credentials and preferences of the user.

The term "learned user profile" refers to a user profile that incorporates information that has been identified, collected, and/or otherwise determined through the analysis of a set of actions and/or behaviors exhibited by a user of an enterprise platform. In some embodiments, the analysis includes, but is not limited to, the application of one or more machine-learning models and/or algorithms that have been trained and/or configured to detect, classify, and/or otherwise process user actions and behaviors within an enterprise platform. In some situations, the learned user profile may incorporate contextual information pertaining to a user that enables the identification and determination of the degree to which one or more search results may be relevant to a user and/or a search request made by the user.

The term "learned user profile value" refers to a qualitative and/or quantitative value that has been incorporated into a learned user profile based at least in part on the analysis of actions and/or behaviors exhibited by a user of an enterprise platform.

The term "search request" refers to a query for electronic documents or digital content items submitted to an enterprise platform by a user utilizing a client device. The term "search results" refers to results returned from such a query. In some examples, a user using the client device may submit a query for "software project version 1.1" into an interface and the system may return a list of digital content items having keywords, metadata, or the like contained therein or associated therewith. The search results thus include the returned list of digital content items, all keywords and metadata associated therewith, and the arrangement or ranked order of the returned list.

The term "preliminary digital content item set" refers to a group of digital content items identified from a query resulting from a search request, where the group of digital content items is preliminary in that it has not been filtered, reduced, enhanced, or improved using the resolved permissions profile.

The term "user-specific digital content item set" refers to a group of digital content items identified from a query resulting from a search request, where the group of digital content items has been reordered, filtered, reduced, enhanced, or improved using the learned user profile and/or learned user profile values extracted from a learned user profile. In this regard, the user-specific digital content item set may represent a subset or modified version of the preliminary digital content item set.

The term "profile context weights" refers to a set of weighting rules or filters that may be applied to one or more items of a preliminary digital content item set. The rules or filter may be associated with one or more learned user profiles, learned user profile values, and the like. Applying profile context weights to the preliminary digital content item set enables ranking and arranging of the items to form the user-specific digital content item set.

The term "digital content item creation timestamp" refers to an identification of network time associated with the creation of a digital content item. The digital content item creation timestamp can be assigned to or associated with a digital content item.

The term "digital content item access timestamp" refers to an identification of network time associated with the access of a digital content item. The digital content item access timestamp can be assigned to or associated with the digital content item.

The term "digital content item occurrence frequency" refers to a count or number of times any digital content item is returned in a set of search query results. The digital content item occurrence frequency may be associated with a software application, or may be an enterprise-wide count. For example, if a search query returns four digital content items that are associated with a first software application, the digital content item occurrence frequency for that digital content item for the first software application may be stored as an indication of four. The digital content item occurrence frequency may further be associated with a particular software application frequently accessed by the user account performing the search query.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system environment 100 within which embodiments of the present invention may operate. Users may access a searchable enterprise platform 115 via a communications network 104 (e.g., the Internet, LAN, WAN, or the like) using client devices 101A-101N. The searchable enterprise platform 115 may comprise a server 107 in communication with one or more databases or repositories 108, 109, 110, and 112A-112N.

The server 107 may be embodied as a computer or computers as known in the art. The server 107 may provide for receiving of electronic data from various sources, including but not necessarily limited to the client devices 101A-101N. For example, the server 107 may be operable to receive and process search requests provided by the client devices 101A-101N. The server 107 may facilitate the generation and providing of various search results comprising digital content items.

The databases or repositories 108-110 and 112A-112N may be embodied as a data storage device such as a Network Attached Storage (NAS) device or devices, or as a separate database server or servers. The databases or repositories 108-110 and 112A-112N include information accessed and stored by the server 107 to facilitate the operations of the searchable enterprise platform 115. For example, the databases 108-110 and 112A-112N may include, without limitation, learned user profiles for users of the searchable enterprise platform 115, user account credentials, use history information associated with users of the searchable enterprise platform 115 (such as content use times, content consumption indications, topic mixes associated with users of the searchable enterprise platform 115, user biographical information, user role and/or user status information with respect to one or more entities associated with the searchable enterprise platform 115, other user profile information, learned user profile values, profile context weights, digital content items, and/or the like.

Learned user profile repository 110 may include a learned user profile for each user of the enterprise platform 115. The learned user profile includes information that has been identified, collected, and/or otherwise determined through the analysis of a set of actions and/or behaviors exhibited by a user of an enterprise platform. A user profile may be created upon registration by a user with the enterprise platform 115 and/or upon registration by the user with one or more software applications and added to learned user profile repository 110. As the user engages in interactions with, and otherwise uses, the enterprise platform 115, information associated with the user's actions, activities, behaviors, content consumption, content consumption patterns, and the like may be captured and analyzed to establish one or more learned user profile values that may be incorporated into a user's particular learned user profile and stored in the learned user profile repository 110.

Learned user profile repository 110 may further be configured and/or used such that each time a user accesses the searchable enterprise platform 115, the learned user profile is retrieved so that the learned user profile can be updated and/or otherwise modified. For example, as a user engages in interactions over time with the searchable enterprise platform 115, additional data points and data sets associated with the user, the content accessed and/or used by the user, and other aspects of the user's interaction with the searchable enterprise platform 115 and/or the digital content items accessible via the searchable enterprise platform 115 may be applied to a machine learning model to adjust and improve the learned user profile of a particular user to more accurately reflect the use behaviors and use patterns of a particular user.

User identity repository 109 may include a user profile and/or information associated with a user profile associated with a user and accessible by the searchable enterprise platform 115. The user profile and/or the information associated with a user profile included in user identity repository 109 may not necessarily be software application specific. In some example implementation, user biographical information, user demographic information, and the like may be stored in user identity repository 109. In some example implementations, information regarding a user's role and/or status at an entity associated with the searchable enterprise platform 115 may be included in user identity repository 109. For example, it may be advantageous in the preparation of a learned user profile to be able to access information regarding the primary tasks or functions that a user performs for an entity associated with the searchable enterprise platform 115 and/or whether the user is in a supervisory, managerial, technical, sales, support, and/or other role at the entity. In some example implementations, information regarding the permissions associated with a particular user may also be included in user identity repository 109.

Use history repository 108 may include user-specific information about the use and/or access of applications and/or digital content items that are supported by the searchable enterprise platform 115. For example, information about the applications used by a particular user, the time spent with each such application, the actions or other activities performed by a user in connection with each application, and the like, may be included in use history repository 108. In some example implementations, information about digital content items viewed by a particular user and/or the time spent by the user viewing each digital content item may be included in use history repository 108.

As shown in FIG. 1, a user profile administrator 111 may be incorporated into searchable enterprise platform 115 and configured to access and interact with use history repository 108, user identity repository 109, and/or learned user profile repository 110. In some example implementations of searchable enterprise 115 and/or server 107, and as described in connection with FIGS. 3, 4 and 5, user profile administrator 111 may apply and/or use a machine learning model to information that is included in use history repository 108, user identity repository 109, and/or learned user profile repository 110. Such additional processing may be performed, for example, to facilitate the creation, use, maintenance, and/or modification of one or more learned user profiles. In some such example implementations, additional processing of the information included in the use history repository 108, user identity repository 109, and/or learned user profile repository 110 may be performed by user profile administrator 111 and/or by user profile administrator 111 in connection with one or more other aspects of server 107, and/or in connection with another device or apparatus.

In an example implementation of additional processing involving use history repository 108, the additional processing may include an analysis of the topics referenced in the digital content items that the user has spent the most time viewing to identify one or more topic mixes that are aligned with a particular user's typical content consumption. Upon the identification of a topic mix, such as by user profile administrator 111, for example, the topic mix may be incorporated into a learned user profile associated with the particular user. In some example implementations within an enterprise platform, one or more software applications associated with that enterprise platform may be configured to generate events that identify the action taken by a given user and the context in which such action takes place. For example, a given software application may be able to detect that a given user has written, commented on, and/or read certain content items, and generate an event and/or other data object that provides an indication of the specific action taken by the user along with information about the content with which the user interacted and/or other information that places the user's actions in context. Such events (which may provide, for example, both action-specific information and contextual information) may be used and/or aggregated in connection with the generation of a user profile and/or a larger population profile.

In an example implementation of additional processing involving user identity repository 109, information about a user's role at an entity associated with searchable enterprise platform 115, typical tasks and responsibilities, and/or biographical information may be processed, such as by user profile administrator 111, for example, to ascertain one or more learned user profile values that may be incorporated into a learned user profile associated with the particular user and included in learned user profile repository 110.

In some example implementations, user profile administrator 111 may be configured to interact with learned user profile repository 110 to add, subtract, modify, and otherwise interact with learned user profiles and/or the learned user profile values that may be included in a given learned user profile.

While many of the example implementations discussed and otherwise referenced herein focus on the development, use, and interaction with a learned user profile associated with a single user, it will be appreciated that embodiments of the invention may be implemented by developing, using, and/or otherwise interacting with learned user profiles that involve the aggregation of behaviors associated with multiple users. For example, a learned population profile may be developed through the monitoring, processing and/or aggregation of the behaviors, traits, and/or other characteristics of multiple users. In some situations, it may be advantageous to develop a learned population profile that reflects the aspects and actions of all, or nearly all, of the users of a particular platform and use that profile in connection with searches performed by new users and/or users who rarely interact with the enterprise platform. With reference to FIG. 1, user profile administrator 111 may be configured to create, modify, and otherwise interact with one or more population profiles in a manner similar to that used in connection with individual learned user profiles. It will be appreciated that in some situations (such as implementations that involve small numbers of users and/or sets of users with a relatively limited history of actions, for example) the user-specific data sets may be insufficient to effectively train one or more models. In some such situations, it may be advantageous to use pooled user data (such as an aggregate of the users associated with a given entity, for example, or a subgroup thereof) to provide a stronger relevance signal than that which may be available for one or more given individual user profiles. It may also be advantageous in some example implementations to employ transfer learning techniques to provide a baseline training level to a machine learning model to provide a more advanced starting point from which per-entity and/or per-user models may be generated.

Content repositories 112A-N may include digital content items associated with software applications supported by the searchable enterprise platform 115. Upon creation or editing, each digital content item is indexed for search according to various metadata associated with the digital content item. Indexing may also be based on text or other electronic data contained within or associated with the digital content item. In some situations, it may also be possible to generate one or more topic models associated with each digital content item within a repository, and/or one or more topic models that are generally applicable to the combined content within a repository.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the searchable enterprise platform 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the searchable enterprise platform 115 via a web browser. As yet another example, the client device 101A-101N may include various hardware or firmware designed to interface with the searchable enterprise platform 115.

An example of a data flow for exchanging electronic information among one or more client devices 101A-101N and the searchable enterprise platform 115 is described below.

In the depicted embodiment, the one or more client devices 101A-101N are configured to generate a search request that is intended to produce search results. The search request is transmitted by wired or wireless communication over the communications network 104 to the searchable enterprise platform 115. In the depicted embodiment, the search request is provided to the search engine 105 of the server 107.

The server 107 utilizes search engine 105 to perform searches or queries based on the search request. The return and display of search results are governed by a context ranking module 106 that applies a learned user profile to cause a ranking and/or re-ranking of search results received from the search engine 105 to reflect a likely context in which the particular user's search arises and cause the search results that are most likely to be highly correlated to the information sought by the user to be displayed to the user. Context ranking module 106 receives a learned user profile, extracts or otherwise retrieves a set of learned user profile values from the learned user profile, and applies context ranking rules and produces a user-specific digital content item set. In some example implementations, context ranking module 106 may further apply profile context weights to a preliminary digital content item set, such that the user-specific digital content item set may be ranked and ordered for display in an interface rendered by one or more of the client devices 101A-101N.

It will be appreciated that databases or repositories 108-110 may be one or more repositories, and may be part of or separate from server 107. As discussed above, a user profile administrator 111 may control assignment of learned user profile information (e.g., user content consumption history, content access and/or content use timing, user identity information, topic mix information, learned user profile values, context weights, etc.) stored in databases or repositories 108-110.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, search circuitry 203, and profile management circuitry 206. The apparatus 200 may be configured to execute the operations described above with respect to FIG. 1 and below with respect to FIGS. 3-5. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly.

Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Search circuitry 203 includes hardware configured to receive search requests and to perform search queries based on such search requests. The search circuitry 203 may utilize processing circuitry, such as the processor 202, to perform these actions. The search circuitry 203 may send and/or receive data from profile management circuitry 206. In some implementations, the sent and/or received data may be data identifying learned user profiles associated with one or more users and the learned user profile values associated with each user's learned user profile. It should also be appreciated that, in some embodiments, the search circuitry 203 may include a separate processor, specially configured field programmable gate array (FPGA), or application specific interface circuit (ASIC). In some implementations, profile management circuitry 206, described below, may be sub-circuitry belonging to search circuitry 203. The search circuitry 203 may be implemented using hardware components of the apparatus configured by either hardware or software for implementing the functions described herein.

Profile management circuitry 206 includes hardware configured to manage learned user profiles (and portions of learned user profiles, such as learned user profile values and/or profile context weights that may be associated with and/or derived from a learned user profile and/or one or more learned user profile values) for one or more users with respect to a user's access to and interaction with an enterprise platform, including but not limited to the digital content items and/or software applications associated with the enterprise platform. The profile management circuitry 206 may utilize processing circuitry, such as the processor 202, to perform these actions. However, it should also be appreciated that, in some embodiments, the profile management circuitry 206 may include a separate processor, specially configured field programmable gate array (FPGA), or application specific interface circuit (ASIC) for performing the functions described herein. Profile management circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for User-Specific Contextual Integration

FIG. 3 illustrates an example data flow 300 that may be used in connection with the development and use of one or more user-specific learned user profiles and the integration of such learned user profiles (and/or learned user profile values associated with such learned user profiles) into a searchable enterprise platform. As shown in FIG. 3, a learned user profile manager 301 may be configured to receive a unique user identifier 302 which may allow the learned user profile manager 301 to identify and/or otherwise determine a particular user associated with an enterprise platform, such that a user-specific learned user profile may be developed, updated, modified and/or otherwise managed. In some example implementations, the unique user identifier may be a user name, a user token, a network and/or platform identification value, and/or a data object that may be configured and/or used to identify a particular user.

Learned user profile manager 301 is also configured to take as inputs a wide range of user-specific information, including but not limited to user behaviors 304A-304N and/or user traits 306A-306N. It will be appreciated that the precise form and substance of user behaviors 304A-304N and user traits 306A-306N may vary depending on the situations in which a particular example implementation of data flow 300 arises, including but not limited situations that may be dependent, at least in part, on the particular enterprise platform, software applications, users, and/or other network components and/or entities with which data flow 300 is implemented. Any of the user behaviors and/or traits disclosed and/or otherwise contemplated herein may be used in example implementations of data flow 300, including but not limited to those discussed in connection with repositories 108-110 and other aspects of FIG. 1. For example, some implementations of data flow 300 involve the use of user behavior information such as information associated with a user's content consumption, such as the amount of time the user spends on any given digital content item, the characteristics of digital content items consumed and/or otherwise used by the user, the software applications used by the user, and the like. Some such example implementations, and other example implementations, involve the use of user traits, such as a role of a given user within an entity associated with the enterprise platform, the tasks and/or other functions performed by the user, user demographic and/or biographical information, and the like. In some example implementations, user behavioral and/or trait information may be analyzed to ascertain one or more latent factors associated with a given user, such as one or more topic mixes that may be used to characterize and/or categorize the types digital content items that are most aligned with the user's needs and interests and the substantive topics that are likely to be addressed in material that a user may be searching for.

As shown in FIG. 3, in response to receiving a unique user identifier and one or more sets of user behavior and/or user trait information, the learned user profile manager produces as an output a learned user profile. In some example implementations, the learned user profile manager may produce the learned user profile through the use of machine learning or a trainable model.

FIG. 4 illustrates an example data flow 400 that may be used in connection with the development and use of one or more user-specific learned user profiles and the integration of such learned user profiles (and/or one or more learned user profile values associated with a learned user profile) into a searchable enterprise platform. As shown in FIG. 4, content search module 401 is configured to be able to search and retrieve digital content items from content repositories 402A-402N. Any content repository that may be associated with and/or accessed by an enterprise platform may be used in connection with example implementations of content repositories 402A-402N, including but not limited to the content repositories 112A-112N discussed and/or referenced in connection with FIG. 1. In response to receiving a search request 403 as an input, the content search module 401 may apply one or more content searching models and/or algorithms to identify and retrieve digital content items that are responsive to the search request 403 from the content repositories 402A-402N. In some example implementations, the content search module 401 applies a term vector model as part of the search and digital content item retrieval process. However, it will be appreciated that other search models, algorithms, and/or search mechanisms may be used in example implementations of content search module 401.

In some example implementations, content search module 401 may be configured to rewrite and/or otherwise enhance the search request 403. For example, the terms contained within a particular search request may be analyzed to identify similar terms, which can then be appended to the search in a manner that allows for an identification of alignment between one or more terms in the appended search and terms, topics, or other indicia that are associated with a particular repository and/or digital content items within a given repository.

As shown in FIG. 4, content search module 401 may produce, as an output, a preliminary digital content item set 404. Preliminary digital content item set 404 may include all, or a subset of all, of the digital content items identified and retrieved from the content repositories 402A-402N. In some example implementations, the preliminary digital content item set 404 may include a list of links, pointers, file paths, selectable elements, and/or other indicia associated with the digital content items identified through the operation of content search module 401. In some example implementations, preliminary digital content item set 404 may be expressed as an ordered list of digital content items, based at least in part on one or more rules associated with content search module 401 and/or the model, algorithm, and/or other search mechanism applied by content search module 401.

As shown in FIG. 4, context integrator 406 is configured to take as inputs at least the preliminary digital content item set 404 and or more learned user profile values 405. In response to receiving preliminary digital content set and one or more learned user profile values, context integrator 406 operates to create a user-specific digital content item set 407, which may take the form of an ordered list of digital content items. The order reflected in such a list may be based, at least in part, on a determination of a degree and/or extent to which each digital content item is likely to be relevant to a particular user's search and the context in which that search arises. In some example implementations, the context integrator 406 may produce the learned user profile through the use of machine learning or a trainable model. For example, context integrator 406 may include a multiple additive regression trees model, such as LambdaMART, to apply the set of learned user profile values to the preliminary digital content item set to reorder the digital content items to prioritize the digital content items within the preliminary digital content item set that are most likely to be relevant to the specific user's needs and/or interests.

As discussed herein, the learned user profile manager 301 and/or the context integrator 406 may employ machine learning or a trainable model such that, over time, the learned user profile manager and/or the context integrator 406, through receiving a plurality of user confirmations, may improve determination of the aspects of a learned user profile, improve the identification of digital content items within a set of search results that are most likely to be considered by the user to be highly relevant to a search request, and/or otherwise reflect the context in which the a specific user's search request arises.

In some embodiments, the learned user profile manager 301 may determine one or more learned user profile values to be included in a learned user profile by analyzing user behavior data associated with a user's interactions with an enterprise platform and/or specific software applications associated with an enterprise platform. By way of example, a user may use a client device to view and otherwise consume multiple digital content items accessible via an enterprise platform. The learned user profile manager, via instructions executed by a user administration module, profile management circuitry, or the like, may determine that a learned user profile value should be adjusted to reflect the topics reflected in the consumed digital content items and/or the time spent by the user in consuming the digital content items.

In some embodiments, the context integrator 406 may determine that the order of search results contained in a preliminary digital content set should be adjusted to reflect a different order by analyzing one or more learned user profile values associated with the particular user that formed and entered the particular search request. By way of example, the learned user profile values may indicate that a user has a particular managerial role within an entity associated with an enterprise platform and/or that the user typically spends the most time with digital content items that contain a particular mix of topics. The context integrator, through the execution of instructions stored thereon and/or through the application of a set of rules, may apply different context weights to each digital content item within the preliminary digital content item set, rank each digital content item according to the applied context weights, and arrange an ordered list of digital content items based at least in part on the applied context weights.

In some further embodiments, the learned user profile manager and/or the context integrator may employ machine learning, or equivalent technology to improve future determinations of learned user profiles and digital content item sets based on learned user profiles. In some examples, the learned user profile manager and/or the context integrator may generally provide a trained model that is given a set of input features, and is configured to provide an output of a learned user profile, a learned user profile value for inclusion in a learned user profile, a score (such as a score of the likely relevance of a particular digital content item to a user and/or a user's search request, or the like. In some embodiments, a trained model can be generated using supervised learning or unsupervised learning. In some examples, such learning can occur offline, in a system startup phase, or could occur in real-time or near real-time during performing the methods shown in the described figures (such as, determining learned user profile values and/or digital content item sets). The trained model may comprise the results of clustering algorithms, classifiers, neural networks, ensemble of trees in that the trained model is configured or otherwise trained to map an input value or input features to one of a set of predefined output items, and modify or adapt the mapping in response to historical data returned from previous iterations (such as determinations of learned user profile values and/or digital content item sets).

Alternatively or additionally, the trained model may be trained to extract one or more features from historical data (such as past user behavioral data, content consumption data, or other user interaction data, for example) using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd based input or the like (e.g., user confirmations).

In some examples, the learned user profile manager and/or the context integrator may be configured to apply a trained model to one or more inputs to identify a set of reliability scores. For example, if the input feature was content consumption behavior from a client device, the learned user profile manager may apply metadata associated with the consumed digital content items to the trained model to determine whether the user consumption data is accurate. In some examples, the trained model would output a suggested reliability score based on other mobile devices that had the same location data.

In some example implementations of data flow 400 that features a context integrator 406 that incorporates a machine-learning and/or trained model, a learning to rank (LTR) approach may be used to improve the relevance ranking of search results obtained from a query received within an enterprise platform. In such an example implementation, content search module 401 may be implemented as a traditional term-based system, which may be configured and used to initially recall the top K documents from one or more content repositories 402A-402N. The initial results may then be re-ranked by the context integrator 406 through the application of a trained LTR model according to a model trained on query-to-document implicit relevance scores. Such query-to-document implicit relevance scores may be obtained by processing historic queries and selected results. In some such example implementations, the historic queries and selected results may be extracted from events emitted in a particular instance of an enterprise platform targeted for training and development of a context-integration system that is capable of re-ranking search results based on an EAC dataset, usage logs, and/or other aspects of a learned user profile.

In some examples of such implementations, a model based at least in part on the LambdaMART algorithm may be used to learn the relevance ranking from an assembled features set and relevance rankings. Some example input features that may be used in the course of training such a model include, but are not limited to: the number of query terms; the number of matched stemmed title terms; the percentage of matched stemmed title terms; the percentage of matched stemmed query terms; the number of matched unstemmed title terms; the percentage of matched unstemmed title terms; the percentage of matched unstemmed query terms; the parameter is-personal-space; whether the space name matches current user; the number of query terms covered by the space terms; the percentage of query terms covered by space terms; the title stemmed bigram matches; the title non-stemmed bigram matches; and/or the percentage of page visits based on visit history (from all pages).

In some such example implementations, and in other example implementations, additional inputs may be used, including but not limited to: the underlying ranker score (from ElasticSearch BM25 scorer, for example); the number of Named Entities found in the document (using named entity recognition classifier, for example); the median document dwell time; the number of links in the document; the number of likes for the document; the number of comments for the document; and/or the query topic score of the document (which may involve finding the topics of the query terms and calculating the score from the document topic mix).

In some example implementations, labels used within a model or system used in connection with user-specific context integration based on a learned user profile may be derived from logged search events within the enterprise platform. In some such situations, the search events may be assembled into a search session by assembling the search executed by a user into a series of query-results pairs.

For example, when a significant pause (such as a pause on the order of tens of seconds, for example) is observed, a session may be deemed to have ended. In such a situation, the page on which the pause is observed may be labeled as highly relevant to the particular user. In an example implementation, the top results (such as the top three results, for example) from the underlying ranking obtained from ElasticSearch or another search protocol may be ranked as "somewhat relevant", and the remaining results may be marked as "not relevant". In some situations, a training set may be assembled over three months of activity to capture a snapshot of recent usage across the enterprise platform. As such, over time, the relevance ranking of one or more results may change, due to shifting user objectives when searching and/or shifting objectives of an entity associated with the enterprise platform, for example.

FIG. 5 is a flow chart of an example process 500 for retrieving and arranging search results in a searchable enterprise platform. As shown at block 501, the process 500 begins by receiving a search request from a network-connected client device associated with a particular learned user profile. The search request may include one or more queries comprised of one or more words, numbers, letters, or other supported characters and/or strings. The search queries reflected in the search request are intended to encompass all digital content items and software applications that are accessible or otherwise supported by the enterprise platform.

The as shown at block 502, process 500 continues by retrieving a set of learned user profile values associated with the learned user profile. In some example implementations of block 502, learned user profile values may be extracted from a learned user profile, such as by parsing a data object that contains and/or is otherwise associated with a learned user profile to acquire the particular learned user profile values that may be relevant to a particular search request, the particular enterprise system environment in which the search request is made, and/or other factors.

The process 500 continues at block 503 by retrieving a set of search results comprising a preliminary digital content item set. In some example implementations of block 503, the preliminary digital content item set is associated with one or more of the software applications that are included with and/or otherwise associated with the enterprise platform. In some such example implementations, retrieving the set of search results comprises applying a first model, such as a term vector model for example, and/or any other model that is capable of applying search terms to one or more repositories of searchable digital content items.

As shown at block 504, the process 500 continues by applying the set of search results and the set of learned user profile values to a second model, such as an MART model, for example, to produce a user-specific digital content item set. Some example implementations of block 504, and process 500 in general, contemplate the use of information obtained and otherwise learned through a user's interactions with an enterprise platform to evaluate and re-rank search results to account for the user-specific context in which a user's search request arises and to reflect a preference for digital content items that, based on the specific user's latent factors and/or other learned characteristics, are most likely to meet the user-specific needs underlying the user's stated search request.

In some example implementations of block 504, applying the set of search results and the set of learned user profile values to the second model comprises applying profile context weights to each digital content item of the set of search results, wherein the profile context weights are based on the set of learned user profile values. In some such example implementations, each digital content item within the set of search results may be ranked according to the applied profile context weights, and the set of search results may be arranged in an ordered listed based at least in part on the ranking.

As shown at block 505, after the user-specific digital content item set is produced in connection with block 504, the user-specific digital content item set is sent as output to the client device associated with the user. In some example implementations of block 505, the user-specific digital content item set may be structured as an ordered list and/or an ordered set of renderable objects that can be presented to a user via a display of the user's client device.

Some of the operations of an example implementation may be expressed as follows, where the following terms are used in the example for purposes of clarity, and not to redefine how such terms may be used elsewhere herein:
  "user" refers to the principal on whose behalf the search operation is being performed;
  "k" refers to the number of documents retrieved for re-ranking;
  "search_query" refers to the user-generated search terms or query for document retrieval;
  "docs_top_k" refers to the documents retrieved using the term search subsystem (such as Elasticsearch, for example);
  "query_feature_vector" refers to a set of attributes (or features) derived from the search query to be used in the re-ranking model (such as LambdaMART, for example);
  "documents_feature_vector" refers to a list of attributes (or features) per retrieved document to be used in the re-ranking model; and
  "user_feature_vector" refers to a list of attributes (or features) for the principal performing the search query. It will be appreciated that the features here may be related to the user's profile and historical product interactions.

Using the above terms, an algorithm in accordance with an example implementation of an embodiment of the invention described and/or otherwise disclosed herein may be generally expressed as follows:

```
docs_top_k = term_search(search_query, k)
user_feature_vector = extract_user_features(user)
query_feature_vector = feature_extract(search_query)
documents_feature_vectors = extract_doc_features(docs_top_k)
ranked_documents = reranking_algorithm(user_feature_vector,
query_feature_vector, documents_feature_vectors)
``` wherein the ranked_documents list is returned as the results for the search.

FIGS. 6A-6B illustrate example search interfaces for use with embodiments of the present invention. An example interface 600 comprises an input section 601 where a user can enter a query string for searching across the enterprise platform. A search selection button 602 may be displayed on the interface 600, and a user may indicate entry of the query string by other means such at pressing the "Enter" key on the keyboard. A display section 603 is available for display of search results.

Example interface 610 includes search results 1-N 604 that are ranked according to the methods described herein. In some example implementations, each of the search results 1-N 604 may be associated with a score 1-N which may reflect, for example, one or more applied profile context weights associated with the result, an expression of a calculated relationship between the result and the search request and/or learned user profile, a normalized scoring of the result with respect to one or more aspects of the learned user profile, or another metric associated with the search result. In some example implementations, the search result and/or score may also include an indication of the software application with which the result is associated. In some such example implementations, the results may be further subdivided based on the software application with which the result is associated.

It will be appreciated that, in addition to the use of learned user profiles as presented herein, the arrangement and display of search results may be governed by a multitude of rules, including but not limited to rules that may be applied when the application of profile context weights to digital content items results in multiple digital content items having the same or similar ranks. For example, ties and/or near ties in weighted rankings of search results may be accounted for by arranging results according to comparisons between timestamps associated with each digital content item. The timestamps may be compared to timestamps of other digital content items, timestamps associated with a user (e.g., when the user joined the enterprise system; the last time the user logged into the system; etc.), timestamps associated with access to the digital content items, among various others.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for integrating user-specific context indicators to a searchable enterprise computer software platform comprising a plurality of software applications, the apparatus comprising at least one processor and at least one memory including computer program code, the at least one memory and the computer program code configured to, with the at least one processor, cause the apparatus to:

receive a search request from a client device associated with a learned user profile;

generate and retrieve a set of learned user profile values associated with the learned user profile, the set of learned user profile values associated with the learned user profile comprising at least one of a user content use history of the enterprise computer software platform wherein the enterprise computer software platform is configured to generate a user content use history of events that identify actions taken by a given user within the enterprise computer software platform and the context in which the actions take place within the enterprise computer software platform, and a user role within an entity associated with the enterprise platform, the user role associated with one or more primary tasks or functions;

retrieve a set of search results comprising a preliminary digital content item set that is directed to guiding the use of the plurality of software applications, wherein retrieving the set of search results comprises applying the search request to a first model;

apply the set of search results and the set of learned user profile values associated with the learned user profile to a second model to produce an enterprise computer software platform-specific and user-specific digital content item set directed to guiding the use of the plurality of software applications; and output the enterprise computer software platform-specific and user-specific digital content item set to the client device associated with the user.

2. The apparatus of claim 1, wherein the set of search results and the set of learned user profile values associated with the user profile are applied to the second model to produce the user-specific digital content item set by:

applying a plurality of profile context weights to each digital content item of the set of search results, wherein the profile context weights are based at least in part on the set of learned user profile values;

ranking each digital content item of the set of search results according to the applied profile context weights; and arranging the set of search results according to the ranking.

3. The apparatus of claim 1, wherein the first model is a term vector model.

4. The apparatus of claim 1, wherein the second model is a multiple additive regression trees model.

5. The apparatus of claim 1, wherein the user content use history contains a set of use time data associated with a set of digital content items previously viewed by the user associated with the learned user profile.

6. The apparatus of claim 5, wherein the user content use history further contains a topic mix identification associated with a set of digital content items previously viewed by the user associated with the learned user profile.

7. A method for integrating user-specific context indicators to a searchable enterprise computer software platform comprising a plurality of software applications:

receiving a search request from a client device associated with a learned user profile;

retrieving a set of learned user profile values associated with the learned user profile, wherein the set of learned user profile values associated with the learned user profile comprise at least one of a user content use history of the enterprise computer software platform wherein the enterprise computer software platform is configured to generate a user content use history of events that identify actions taken by a given user within the enterprise computer software platform and the context in which the actions take place within the enterprise computer software platform, and a user role within an entity associated with the enterprise platform, the user role associated with one or more primary tasks or functions;

retrieving a set of search results comprising a preliminary digital content item set that is directed to guiding the use of the plurality of software applications, wherein retrieving the set of search results comprises applying the search request to a first model;

applying the set of search results and the set of learned user profile values associated with the learned user profile to a second model to produce an enterprise computer software platform-specific and user-specific digital content item set directed to guiding the use of the plurality of software applications; and outputting the enterprise computer software platform-specific and user-specific digital content item set to the client device associated with the user.

8. The method of claim 7, wherein applying the set of search results and the set of learned user profile values associated with the user profile to the second model to produce the user-specific digital content item set comprises:

applying a plurality of profile context weights to each digital content item of the set of search results, wherein the profile context weights are based at least in part on the set of learned user profile values;

ranking each digital content item of the set of search results according to the applied profile context weights; and arranging the set of search results according to the ranking.

9. The method of claim 7, wherein the first model is a term vector model.

10. The method of claim 7, wherein the second model is a multiple additive regression trees model.

11. The method of claim 7, wherein the user content use history contains a set of use time data associated with a set of digital content items previously viewed by the user associated with the learned user profile.

12. The method of claim 11, wherein the user content use history further contains a topic mix identification associated with a set of digital content items previously viewed by the user associated with the learned user profile.

13. A computer program product for integrating user-specific context indicators to a searchable enterprise computer software platform comprising a plurality of software applications, comprising at least one non-transitory computer-readable storage medium having computer-executable program code instruction stored therein, the computer-executable program code instructions comprising program code instructions configured to:

receive a search request from a client device associated with a learned user profile;

retrieve a set of learned user profile values associated with the learned user profile, retrieving a set of learned user profile values associated with the learned user profile, wherein the set of learned user profile values associated with the learned user profile comprise at least one of a user content use history of the enterprise computer software platform wherein the enterprise computer software platform is configured to generate a user content use history of events that identify actions taken by a given user within the enterprise computer software platform and the context in which the actions take place within the enterprise computer software platform, and a user role within an entity associated with the enterprise platform, the user role associated with one or more primary tasks or functions;

retrieve a set of search results comprising a preliminary digital content item set that is directed to guiding the use of the plurality of software applications, wherein retrieving the set of search results comprises applying the search request to a first model;

apply the set of search results and the set of learned user profile values associated with the learned user profile to a second model to produce an enterprise computer software platform-specific and user-specific digital content item set directed to guiding the use of the plurality of software applications; and output the enterprise computer software platform-specific and user-specific digital content item set to the client device associated with the user.

14. The computer program product of claim 13, wherein applying the set of search results and the set of learned user profile values associated with the user profile to the second model to produce the user-specific digital content item set comprises:

applying a plurality of profile context weights to each digital content item of the set of search results, wherein the profile context weights are based at least in part on the set of learned user profile values;

ranking each digital content item of the set of search results according to the applied profile context weights; and arranging the set of search results according to the ranking.

15. The computer program product of claim 13, wherein the first model is a term vector model.

16. The computer program product of claim 13, wherein the second model is a multiple additive regression trees model.

17. The computer program product of claim 13, wherein the user content use history contains a set of use time data associated with a set of digital content items previously viewed by the user associated with the learned user profile.

18. The computer program product of claim 17, wherein the user content use history further contains a topic mix identification associated with a set of digital content items previously viewed by the user associated with the learned user profile.

\* \* \* \* \*